United States Patent
Levin

(10) Patent No.: US 10,903,781 B2
(45) Date of Patent: Jan. 26, 2021

(54) SOLAR POWER SYSTEM FOR MARINE DOCK

(71) Applicant: Designer Direct, Inc., Des Plaines, IL (US)

(72) Inventor: Kerry Ira Levin, Des Plaines, IL (US)

(73) Assignee: Designer Direct, Inc., Des Plaines, IL (US)

( * ) Notice: Subject to any disclaimer, the term of this patent is extended or adjusted under 35 U.S.C. 154(b) by 266 days.

(21) Appl. No.: 16/028,409

(22) Filed: Jul. 6, 2018

(65) Prior Publication Data

US 2019/0013768 A1    Jan. 10, 2019

Related U.S. Application Data

(60) Provisional application No. 62/529,825, filed on Jul. 7, 2017.

(51) Int. Cl.
*H02S 20/20* (2014.01)
*H02J 7/35* (2006.01)
(Continued)

(52) U.S. Cl.
CPC .............. *H02S 20/20* (2014.12); *E02B 3/068* (2013.01); *F16M 13/022* (2013.01); *F24S 25/12* (2018.05);
(Continued)

(58) Field of Classification Search
CPC .......... H02S 20/20; H02S 20/10; H02S 20/30; H02S 50/00; H02S 50/10; H02S 30/10;
(Continued)

(56) References Cited

U.S. PATENT DOCUMENTS

| | | |
|---|---|---|
| 3,307,514 A | 3/1967 | Young |
| 4,683,901 A | 8/1987 | Mitchell |

(Continued)

FOREIGN PATENT DOCUMENTS

| | | |
|---|---|---|
| CA | 2088948 A1 | 8/1994 |
| CA | 2916336 A1 | 10/2016 |

(Continued)

OTHER PUBLICATIONS

Goal Zero Yeti 1400 Lithium Portable Solar Generator Kit with MPPT & Boulder 100 Briefcase—V2 with Wi-fi, https://tinyurl.com/sepxwk7 (see full URL on attached sheet)(accessed Jun. 13, 2017).

(Continued)

*Primary Examiner* — Richard Isla
*Assistant Examiner* — Manuel Hernandez
(74) *Attorney, Agent, or Firm* — Steven L. Fisher-Stawinski

(57) ABSTRACT

A solar power system for a marine dock includes a telescoping vertical member affixed to a dock via a bracket. A solar panel is pivotably and rotatably affixed to the top end of the telescoping vertical support. A weatherproof equipment container is affixed to the telescoping vertical support. A meter unit, battery, and inverter are housed within the weatherproof equipment container. First leads connect the solar panel to the meter unit, which is configured to measure and display energy and/or power generated by the solar panel. Second leads are configured so that current is passed through the meter unit to the battery in a charging configuration. A third lead connects one terminal of the battery to a measurement terminal on the meter unit, which is configured to measure and display the output voltage of the battery. Fourth leads connect the battery to the inverter in a discharge configuration.

19 Claims, 8 Drawing Sheets

(51) Int. Cl.

| | |
|---|---|
| *H02S 40/32* | (2014.01) |
| *H02S 40/38* | (2014.01) |
| *E02B 3/06* | (2006.01) |
| *H02S 20/30* | (2014.01) |
| *H02J 7/00* | (2006.01) |
| *H02S 30/00* | (2014.01) |
| *H02S 20/10* | (2014.01) |
| *F24S 25/12* | (2018.01) |
| *H02S 50/00* | (2014.01) |
| *H02S 30/10* | (2014.01) |
| *H02S 40/34* | (2014.01) |
| *H02S 50/10* | (2014.01) |
| *F16M 13/02* | (2006.01) |
| *E02B 3/20* | (2006.01) |
| *H01R 25/00* | (2006.01) |

(52) U.S. Cl.
CPC .............. *H02J 7/0047* (2013.01); *H02J 7/35* (2013.01); *H02S 20/10* (2014.12); *H02S 20/30* (2014.12); *H02S 30/00* (2013.01); *H02S 30/10* (2014.12); *H02S 40/32* (2014.12); *H02S 40/34* (2014.12); *H02S 40/38* (2014.12); *H02S 50/00* (2013.01); *H02S 50/10* (2014.12); *E02B 3/20* (2013.01); *H01R 25/006* (2013.01)

(58) Field of Classification Search
CPC .......... H02S 30/00; H02S 40/34; H02S 40/32; H02S 40/38; H02J 7/35; H02J 7/0047; F24S 25/12; F24S 30/425; F24S 10/17; F16M 13/022; E02B 3/068; E02B 3/20; H01R 25/006
USPC ........................................................ 320/101
See application file for complete search history.

(56) References Cited

U.S. PATENT DOCUMENTS

| | | | |
|---|---|---|---|
| 4,890,599 A | | 1/1990 | Eiden |
| 5,185,972 A | | 2/1993 | Markiewicz |
| 5,445,487 A | | 8/1995 | Koscinski, Jr. |
| 5,524,854 A | | 2/1996 | McSwain |
| 5,836,516 A | | 11/1998 | Van Epps |
| 6,217,259 B1 | | 4/2001 | Godbersen |
| 6,396,239 B1 | | 5/2002 | Benn |
| 6,536,992 B1 | | 3/2003 | Floe |
| 7,137,608 B2 | | 11/2006 | Willey |
| 7,285,719 B2 | | 10/2007 | Conger |
| 7,353,769 B2 | | 4/2008 | Unrast |
| 8,387,318 B2 | | 3/2013 | Kaufman |
| 8,511,007 B2 | | 8/2013 | Powers |
| 8,825,500 B2 | | 9/2014 | DeBartolo |
| 8,854,794 B2 | | 10/2014 | Straten |
| 8,991,117 B1 | | 3/2015 | Walker |
| 9,153,718 B2 | | 10/2015 | Richardson |
| 9,345,941 B1 | | 5/2016 | Celedon |
| 9,556,640 B2 | | 1/2017 | Levin |
| 9,776,687 B2 | | 10/2017 | Levin |
| 9,777,504 B2 | | 10/2017 | Levin |
| 2007/0295379 A1 | | 12/2007 | Basta |
| 2007/0295384 A1 | | 12/2007 | Uozumi |
| 2008/0168938 A1 | | 7/2008 | Impey |
| 2009/0173709 A1 | | 7/2009 | Spitsbergen |
| 2011/0041834 A1* | | 2/2011 | Liao ........................ G05D 3/105 126/605 |
| 2011/0135399 A1 | | 6/2011 | McKay |
| 2013/0098858 A1 | | 4/2013 | Cusson |
| 2013/0139870 A1 | | 6/2013 | Nuernberger |
| 2013/0319962 A1* | | 12/2013 | Park ........................ F16B 5/0685 211/41.1 |
| 2014/0196387 A1 | | 7/2014 | Neito |
| 2014/0240968 A1* | | 8/2014 | Brown ..................... F21S 9/032 362/183 |
| 2014/0283894 A1* | | 9/2014 | Silver ..................... F24S 25/10 136/246 |
| 2015/0000725 A1 | | 1/2015 | Reilly |
| 2015/0061568 A1* | | 3/2015 | Martinez .................. H02J 7/35 320/101 |
| 2015/0159337 A1 | | 6/2015 | Kellner |
| 2015/0216273 A1 | | 8/2015 | Akin |
| 2015/0308143 A1 | | 10/2015 | Levin |
| 2016/0289989 A1 | | 10/2016 | Creagh |
| 2016/0368571 A1 | | 12/2016 | Levin |
| 2017/0096834 A1 | | 4/2017 | Levin |
| 2017/0254038 A1 | | 9/2017 | Levin |
| 2017/0349242 A1 | | 12/2017 | Levin |
| 2017/0350156 A1 | | 12/2017 | Levin |

FOREIGN PATENT DOCUMENTS

| | | |
|---|---|---|
| CA | 2933478 A1 | 12/2016 |
| CA | 2959902 A1 | 9/2017 |
| WO | WO2011140557 | 11/2011 |

OTHER PUBLICATIONS

Pier-port 4, Youtube Video, https://www.youtube.com/watch?v=ZFcdmitfB1Q, Dec. 26, 2014 (Includes dated web page print followed by page of still images summarizing video).

Pier-port 6, Youtube Video, https://www.youtube.com/watch?v=p4oxEgZDreQ, Apr. 6, 2015 (Includes dated web page print followed by page of still images summarizing video).

Pier-port 6, Youtube Video, https://www.youtube.com/watch?v=-KR4u5i6ego, Apr. 7, 2015 (Includes dated web page print followed by page of still images summarizing video).

Pier-Port|Cantilevered Boat Canopy, Pier-port.com, The Internet Wayback Machine, Apr. 7, 2015, https://web.archive.org/web/20150407033100/http://pier-port.com/ (Prints and screenshots of dated snapshot).

"Pier Port Canopy", Google Plus Photo Album, https://get.google.com/u/0/albumarchive/110920703178663712557/album/AF1QipNE1WevACOPKOBohs3ZbF67jas087WWCg-mdfpl (19 Photographs dated between May 31, 2014 and Feb. 15, 2015).

List of Patent Applications Treated As Related, signed Jul. 6, 2018.

Unpublished U.S. Appl. No. 16/028,410, filed Jul. 6, 2018.

Gallagher B200 Solar Energizer, ruralmfg.com, http://www.ruralmfg.com/mall/2_EF01_EN34_B200-Solar.aspx?gclid=CjwKEAjwqZ7GBRC1srKSv9TV_iwSJADKTjaDabPksNuZ5coAZXzhLbCleuaOgD-ujLb4ozQZZfYoJRoCy8Lw_wcB - gallagher B200 (accessed Jun. 13, 2017).

Solar e Power Cube 1500 Plus, Solar Innovations, Wagan Tech, http://wagan.com/wagan-tech/solar-products/solar-e-power-cube-1500-plus.html (accessed Jun. 13, 2017).

Goal Zero Yeti 1400 Lithium Portable Solar Generator Kit with MPPT & Boulder 100 Briefcase—V2 with Wi-fi, https://www.earthtechproducts.com/yeti-1400-lithium-solar-generator-kit.html?utm_source=googleshopping&utm_medium=cse&utm_campaign=broi&gdffi=5c42408c468c4d57be3f9140e1306624&gdfms=EABA5D13916742F8BEF0F0FA6C249A9A&gclid=CjwKEAjwqZ7GBRC1srKSv9TV_iwSJADKTjaDf7dE8ja3qwmvan4Fr1DTm72nXOXwoF4HEcbbDzSZQRoCFFbw_wcB (accessed Jun. 13, 2017).

Shop Rubbermaid 17-in L x 18-in W 19-Gallon Sandstone Resin Deck Box at Lowes.com, https://www.lowes.com/pd/Rubbermaid-17-in-L-x-18-in-W-19-Gallon-Sandstone-Resin-Deck-Box/50183803?cm_mmc=SCE_PLA_ONLY-_-SeasonalOutdoorLiving-_-SosPatioFurniture-_-50183803:Rubbermaid&CAWELAID=&kpid=50183803&CAGPSPN=pla&k_clickID=3dac3b64-968e-451f-8af5-9b6a183d7683&gclid=CjwKCAjwsdfZBRAkEiwAh2z65vNH2ZEIURWUh1MqhtfA2nBKrNtpSHFdBCeZEXuPwQwnPfQKazGtMhoCaLcQA vD_BwE (accessed Jul. 6, 2017).

(56) References Cited

OTHER PUBLICATIONS

WindyNation 100 Watt 100W Solar Panel for 12 Volt Battery Charging RV, Boat, Ebay, https://www.ebay.com/itm/WindyNation-100-Watt-100W-Solar-Panel-for-12-Volt-Battery-Charging-RV-Boat-/122105289132?epid=1737177982&hash=item1c6e0ad9ac:g:UT4AAOSwljJZWDEW. (accessed Jul. 6, 2017).
120W 12V Monocrystalline Semi-flexible Solar Panel Battery Charge = 1.5m Wire, Ebay, http://www.ebay.com/tm/120W-12V-Monocrystalline-Semi-flexible-Solar-Panel-Battery-Charge-1-5m-Wire-/332202879482?hash=item4d58d5a9fa:g:OZ0AAOSw42dZB-6X (accessed Jul. 6, 2017).
Pwm 30A Solar Charge Controller 12V 24V LCD Display Dual USB Solar Panel Charger, http://www.edbay.com/itm/PWM-30A-Solar-Charge-Controller-12V-24V-LCD-Display-Dual-USB-Solar-Panel-Charger-/172637672390?hash=item283201d3c6:g:H~4AAOSwBOtY-th~ (accessed Jul. 6, 2017).
https://www.homedepot.com/p/Nautilus-31-Deep-Cycle-Marine-Battery-31MDC/205309650?keyword=deep+cell+battery, Home Depot, https://www.homedepot.com/p/Nautilus-31-Deep-Cycle-Marine-Battery-31MDC/205309650?keyword=deep+cell+battery (accessed Jul. 6, 2017).

\* cited by examiner

SOLAR POWER SYSTEM FOR MARINE DOCK

CROSS-REFERENCE TO RELATED APPLICATIONS

This application claims the benefit of U.S. Provisional Application No. 62/529,825 filed Jul. 7, 2017.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Recent years have seen more and more marine-specific or marine-relevant electrical equipment is available for use dockside, such as boat lifts, pond aerators, weed removers, and power tools. The need to provide dockside lighting has also increased. Further, recent years have seen increased availability of light, plug-in electric watercraft. In addition, there has been a proliferation in portable electronic devices for communication and entertainment on the go. With the ubiquity of these devices has come the need for ubiquitous access to mains electricity for charging and/or powering portable devices. These developments have caused difficulties for users of recreational and commercial watercraft, especially on inland lakes and waterways, because mains electricity is often unavailable at docking sites. For example, local regulations on many lakes and rivers prohibit permanent structures from being erected at the waterside, and such prohibitions extend to permanent boathouses, shorehouses, sheds, and other structures that could be constructed with connections to mains electricity. Other restrictions result from wide shallow areas near shore, where temporary or permanent but unpowered docks and/or piers may extend a substantial distance, e.g., 100 feet or more, in order to reach a navigable waterway. Extension cords run from shore structures become impractical and unsafe to use in such configurations, as attested to by incidents of swimmers being electrocuted due to unsafe dock power arrangements. Similarly, many small watercraft such as kayaks, canoes, powered personal watercraft, and outboard motorboats maintain either no onboard electrical system or a minimal onboard electrical system configured only for powering a starter motor and onboard instruments and not external devices. Even larger motorboats equipped with a battery and/or alternator for running onboard instrumentation often are not equipped with a 120V or 240V inverter and/or transformer to supply mains electricity. Users of watercraft continue to face challenges in providing mains electricity at the pier.

SUMMARY OF THE INVENTION

A solar power system for a marine dock includes a telescoping vertical member affixed to a dock via a bracket. A solar panel is pivotably and rotatably affixed to the top end of the telescoping vertical support. A weatherproof equipment container is affixed to the telescoping vertical support. A solar charge controller, battery, and inverter are housed within the weatherproof equipment container. First leads connect the solar panel to the solar charge controller, which is configured to measure and display energy and/or power generated by the solar panel. Second leads are configured so that current is passed through the solar charge controller to the battery in a charging configuration. A third lead connects one terminal of the battery to a measurement terminal on the solar charge controller, which is configured to measure and display the output voltage of the battery. Fourth leads connect the battery to the inverter in a discharge configuration.

DETAILED DESCRIPTION OF THE INVENTION

Figure 1:
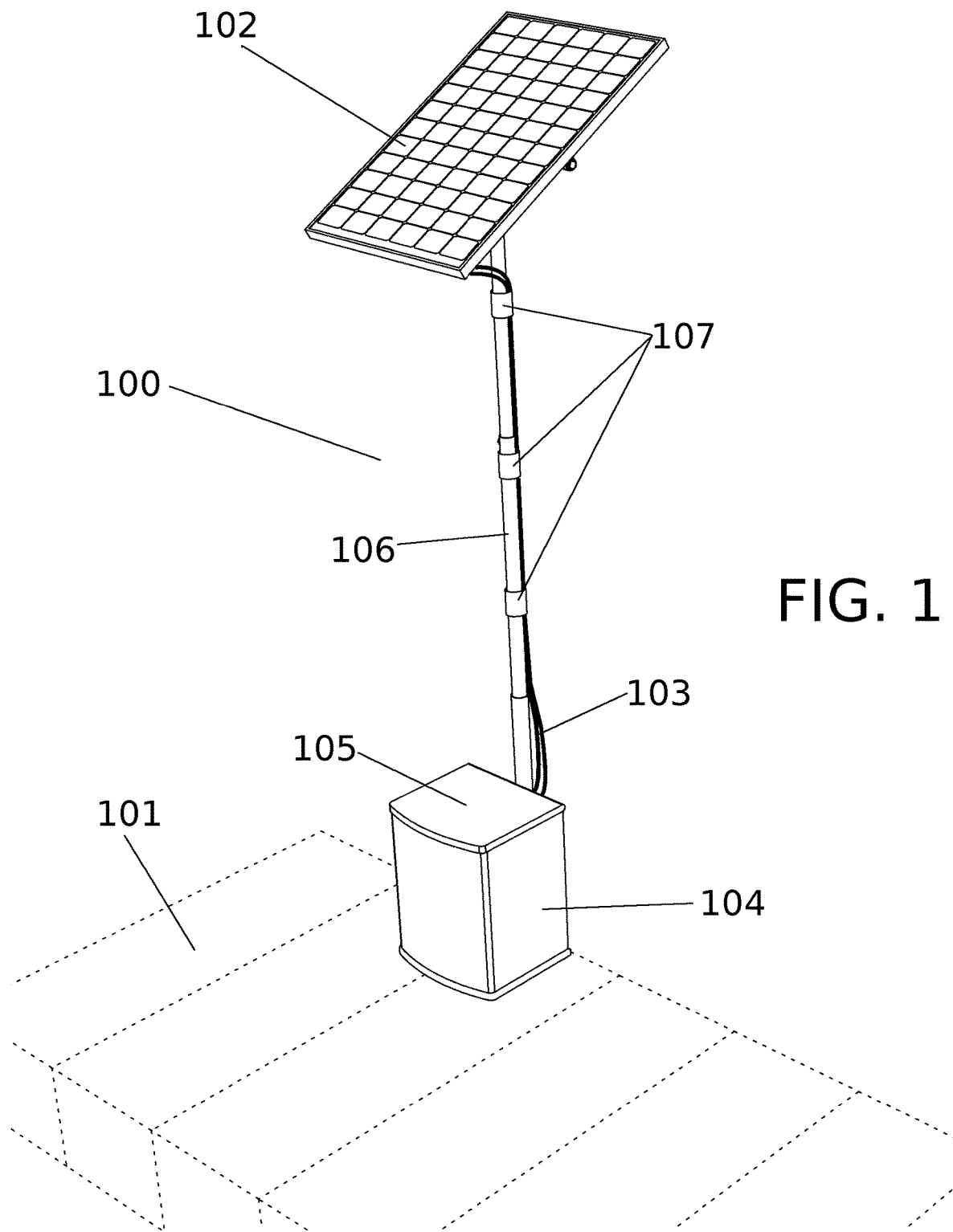
FIG. 1 is a front-right elevated view of a solar power system, in accordance with at least one embodiment of the invention.

Referring now to the invention in more detail, the invention is directed to a solar power system for a marine dock. FIG. 1 depicts a front-right elevated view of a solar power system, in accordance with at least one embodiment of the present invention. In the depicted embodiment, a dock 101, for example a floating or fixed marine dock for mooring watercraft, supports the solar power system 100. The solar power system 100 of the depicted embodiment includes a solar panel 102.

The solar panel 102 may include any combination of solar cells based on any combinations of photovoltaic materials and/or technologies including monocrystalline silicon cells, polycrystalline silicon cells, thin film (TF) cells, Perovskite cells, organic solar cells (OSC), quantum dot cells, or other existing or emerging photovoltaic technology. Non-photovoltaic solar energy collection mechanisms are contemplated as well. In various embodiments, the solar panel 102 is a semi-flexible, rectangular, planar member, and the photovoltaic material is based on monocrystalline silicon. Many commercially available flexible solar panels can bend up to or over 30° from their equilibrium shape. In other embodiments, rigid silicon photovoltaics may be used readily, as well. For example, the depicted embodiment may resemble a rigid solar panel based on mono- or polycrystalline silicon solar cells, together with rigid support and framing. In various embodiments, circular or other nonrectangular shapes may be applied to the solar panel 102. In various embodiments, flexible photovoltaics, such as TF cells may be supported, hung, or draped from one or more support structures of the solar power system 100. In various embodiments, multiple solar panels may be included in the solar power system 100 and supported together with the solar panel 102 on the same support structure, or multiple support structures.

Referring still to the embodiment of FIG. 1, the solar panel 102 is supported by a telescoping support 106. The solar panel 102 may be affixed pivotally to the top of the telescoping support 106. The solar panel 102 may likewise be rotatably affixed to the telescoping support 106 and/or the telescoping support may be rotatably affixed with respect to the pier. Thus, by pivoting and rotating the solar panel 102, a user may align the solar panel 102 with the direction of sunlight in the locale and time of day where the solar power system 100 is installed. Additionally, the user may extend or retract the telescoping support 106 to achieve a line of sight from the sun to the solar panel 102, which may be obstructed at the level of the dock 101 or at higher positions. In alternative embodiments, the telescoping support may be omitted and the solar panel 102 affixed to another structure present at the dock, such as a watercraft canopy cover, boathouse, dock rail, or other structure.

Referring still to the embodiment of FIG. 1, lead retainers 107 retain the solar panel leads 103 from the solar panel 102 to the telescoping support 106. The lead retainers 107 may be bands of formed or woven elastic material, adhesive tape, fabric loops secured by hook and loop fasteners, zip ties, heat shrink tubing, or other fastener suitable for securing cabling to a rigid member. In the depicted embodiment, the lead retainers 107 are distributed across several sections of the telescoping support 106, which allows the telescoping support 106 to be retracted without damage the solar panel leads 103. The embodiment depicted in FIG. 1 may be understood to be fully extended, with no slack remaining in the solar panel leads 103. In various embodiments, the lead retainers 107 may be omitted and the solar panel leads 102 may be run through the interior of the telescoping support 106 and into the equipment container 104.

At or near the base of the telescoping support 104 is a weatherproof equipment container 104, accessible via an equipment container lid 105, which may be pivotably affixed to the rest of the equipment container 104. The equipment container 105 may be made of a UV-stabilized high density plastic material. Exemplary plastics include high density polyethylene (HDPE), ultra high molecular weight polyethylene (UHMW-PE), and acrylonitrile butadiene styrene (ABS), all with appropriate additives for UV-stabilization. Alternative materials include other plastics, steel, aluminum, pressure treated lumber, porcelain, concrete, or other rigid and durable materials. In various embodiments, an off-the-shelf container marketed as a "resin deckbox" may be used as the equipment container 104. In the depicted embodiment, the equipment container lid 105 is shown as being pivotably affixed and being liftable to allow access to the interior of the equipment container 104. Alternative embodiments include configurations that have one or two front-panel cabinet-style doors or no access panels and only externally accessible sockets, jacks, instruments, etc. In various embodiments, the equipment container 104 and/or equipment container lid 105 may be lockable via integrally shaped compatible loops through which a padlock, bolt, chain, or other locking mechanism may be placed, or, alternatively, a key, combination, or electronic locking mechanism may be embedded therein. In various embodiments, one or more vent holes, such as round holes 2"-4" in diameter may be drilled in the side of the equipment container 104; this provides ventilation for the contained electronic components to cool by convection. Embodiments including larger batter banks or inverters may be equipped with heat sinks, fans, or other cooling structures and/or apparatus.

Figure 2:
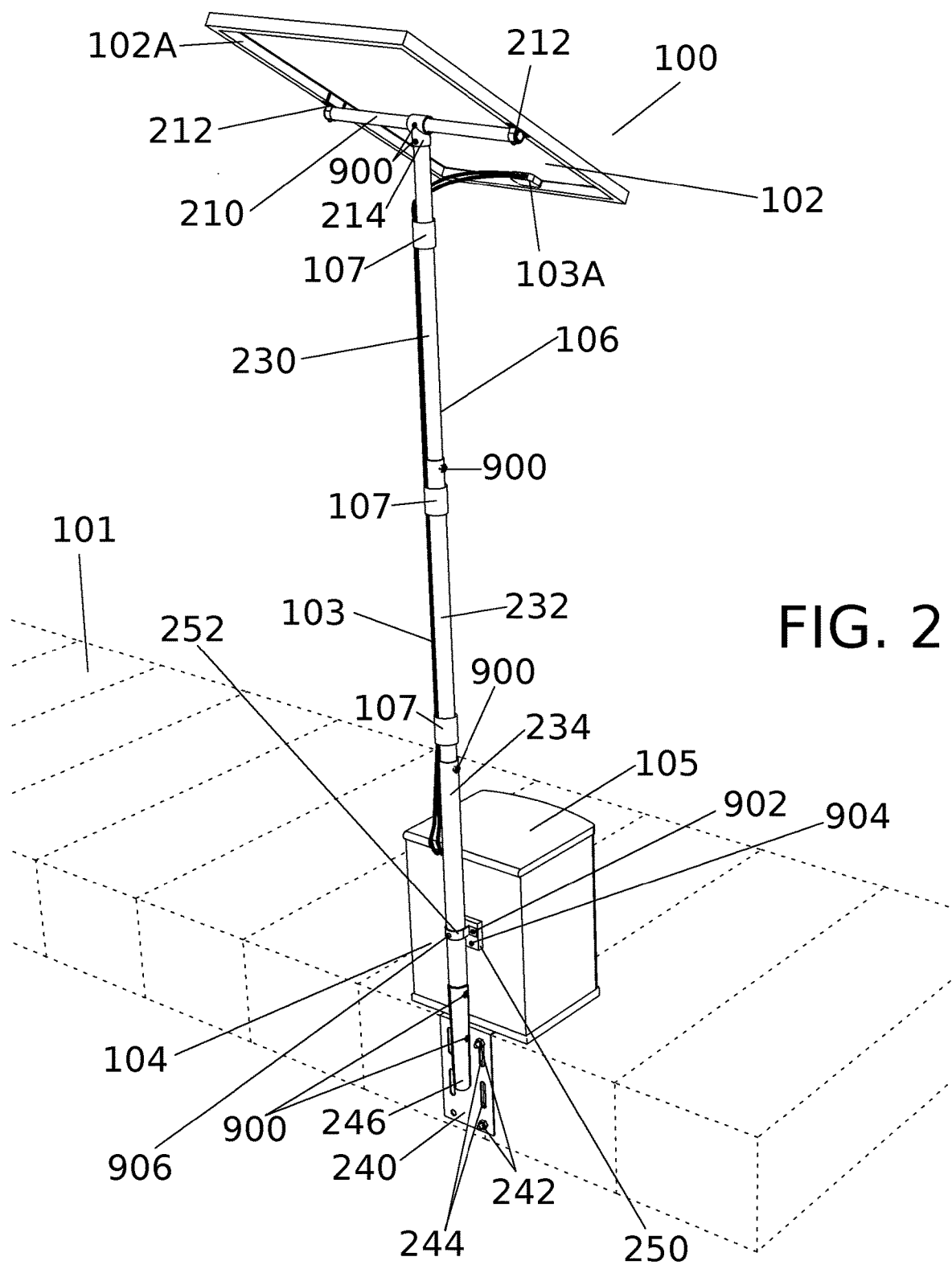
FIG. 2 is a rear-right elevated view of a solar power system, in accordance with at least one embodiment of the invention.

Referring now to FIG. 2, FIG. 2 is a rear-right elevated view of a solar power system, in accordance with at least one embodiment of the invention. In the embodiment depicted in FIG. 2, a T-clamp 214 secures a horizontal member 210 to the top of the telescoping support 106. The T-clamp 214 may include embedded Allen bolts 900 or similar fasteners to achieve fixed or rotatable attachment to the telescoping support 106, and fixed or rotatable and/or slidable attachment to the horizontal member 210. Solar panel horseshoe clamps 212 may affix the solar panel frame 102A, which extends backward from the photovoltaic surface of the solar panel 102, to the horizontal member 210.

The solar panel leads 103 may be removably placed in electrical communication with the terminals of the solar panel 102 via a solar panel lead connector 103A. The solar panel lead connector 103A may be any off-the-shelf electrical connector of two or more conductors, of which many are available.

The telescoping support 106 may include several sections. In the embodiment of FIG. 2, a first telescoping section 230 sits slidably inside a second telescoping section 232, which sits slidable inside a third telescoping section 234. The degree of telescoping, that is, extension or contraction, may be adjusted by sliding each telescoping section 230-234 within the one below it under tension ranging from fixed to free sliding, which may be adjusted by tightening or loosening embedded Allen bolts 900 or alternative fasteners located at the top end of each telescoping section 230-234. Each telescoping section 230-234 may be constructed of steel or aluminum tubing, other metal tubing material, polyvinyl chloride (PVC) pipe, other plastic tubing materials, as well as ceramic or concrete materials. The depicted telescoping sections 230-234 are circular in cross section, which allows each part to be rotated inside of its outer part. In alternative embodiments, tubing with a square, rectangular, or other cross-section is contemplated as well. In such embodiments, rotatability of the solar panel 102 with respect to the dock 101 may be omitted or may be provided by a single rotatable joint at any point in the telescoping support. In various embodiments, more or fewer telescoping sections may be provided in uniform or varying length, and they may be assembled to reach any desired total height. In other alternative embodiments, the telescoping support 106 may be replaced with a fixed, non-telescoping support, equivalent to a single telescoping section.

The equipment container 104 may be affixed to the telescoping support 106. An equipment container horseshoe clamp 252 may affix the third (or any other) telescoping section 234 to the equipment container 104 such that the third telescoping section 234 sits in the loop portion of the equipment container horseshoe clamp 252. In various embodiments, a spacer 250 may sit between the third telescoping section 234 and the equipment container 104. The container horseshoe clamp may be affixed to the spacer 250 via horseshoe clamp end fasteners 902 and to the third telescoping section 234 via horseshoe clamp central fastener 906. The spacer 250 may in turn be affixed to the equipment container 104 via spacer fasteners 904. For various embodiments, the equipment container 104 may be an off-the-shelf resin deckbox, which may feature structural devices and/or decorations, such as a lip; the spacer 250 may be configured to accommodate such structural devices and/or decorations to allow both the telescoping support 106 and the equipment container 104 to remain vertical. In alternative embodiments, the equipment container may be affixed directly to the dock 101 or left freestanding.

Referring still to FIG. 2, a bracket 240 may provide a bracket pole member 246, in which may fit the third telescoping section 234, as shown. The third telescoping section 234 may be secured within the bracket pole member 246 via embedded Allen bolts 900, as shown, or other suitable fasteners. The bracket pole member 246 may be affixed, for example by welding, to the bracket 240. The bracket pole member 246 may be positioned distally from the bracket 240, as shown. The bracket 240 includes various holes 244, which accommodate bracket fasters 242, such as bolts, which affix the bracket 240 to the dock 101.

Figure 3:
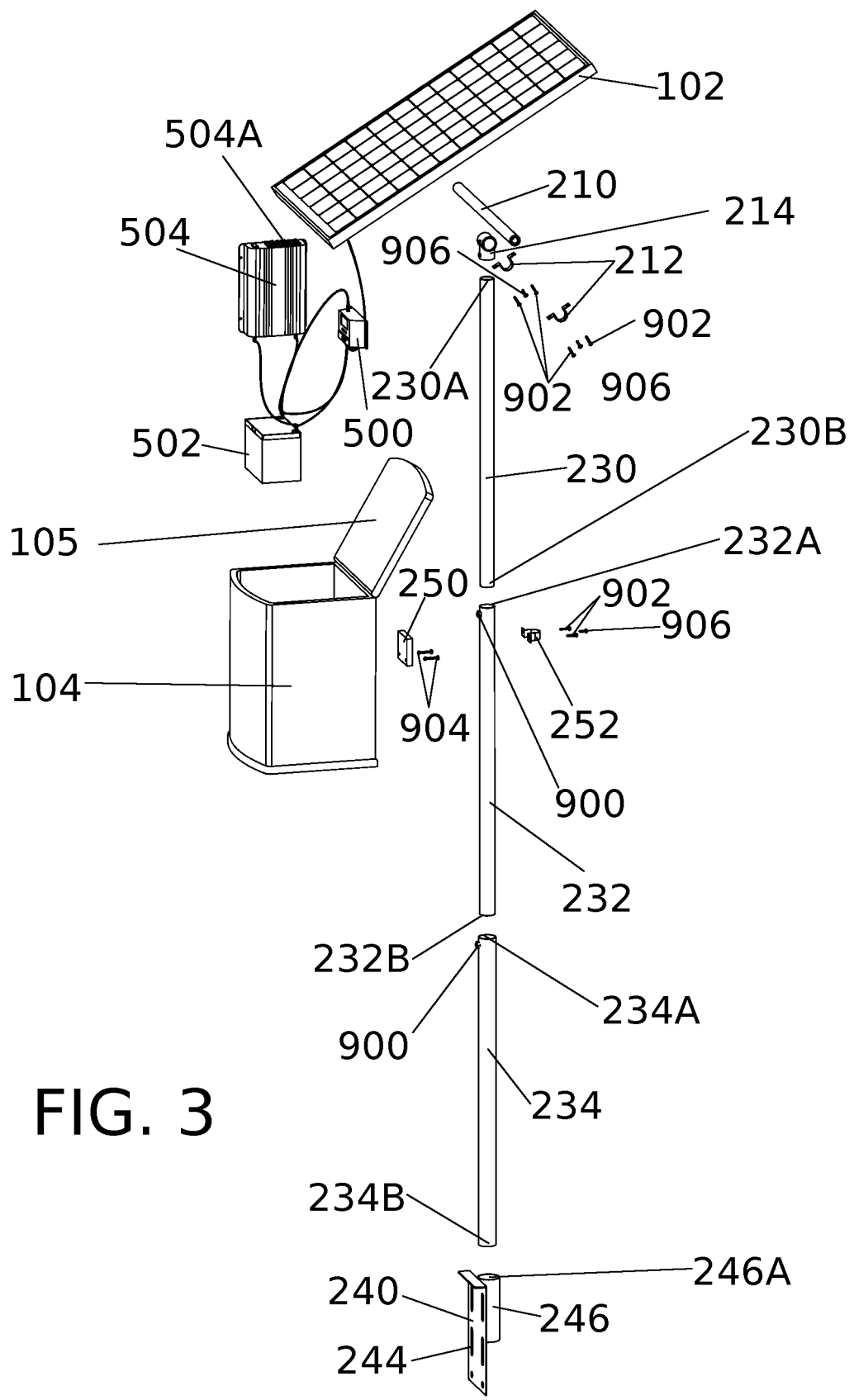
FIG. 3 is an exploded profile view of a solar power system, in accordance with at least one embodiment of the invention.

Referring now to FIG. 3, FIG. 3 is an exploded profile view of a solar power system, in accordance with at least one embodiment of the invention. FIG. 3 introduces various fasteners. Specifically, horseshoe clamp end fasteners 902 secure the solar panel horseshoe clamps 212 to the solar panel frame 102A. The solar panel horseshoe clamps 212 are secured to the horizontal member 210 via the horseshoe clamp central fasteners 906. Similarly, the horseshoe clamp central fasteners 906 also affix the equipment container horseshoe clamp 252 to the space 250 via the horseshoe clamp edge fasteners 902. Similarly, the spacer fasteners 904 affix the spacer 250 the equipment container 104. The various fasteners 902-906 may be screws, nails, bolts, pegs, rivets, clamps, adhesives, permanent magnets, electrostatic cling elements, or other suitable fasters. The solar panel frame may be made of material that can accept a screw directly, such as various plastic or wood materials, or a threaded or non-threaded hole may be drilled therein, or a threaded but or receiver may be embedded therein. Similar accommodating structures may be present in the horizontal member 210, any of the telescoping sections 230-234, or the equipment container 104.

Referring still to FIG. 3, FIG. 3 introduces various subcomponents. The first telescoping section 230 includes a first telescoping section top end 230A and first telescoping section bottom end 230B. The second telescoping section 232 includes a second telescoping section top end 232A and a second telescoping section bottom end 232B. The third telescoping section 234 includes a third telescoping section top end 234A and third telescoping section bottom end 234B. The bracket pole member 246 includes a bracket pole member top end 246A.

Referring still to FIG. 3, FIG. 3 introduces various primary electrical components of the solar power system 100. A solar charge controller 500 is configured to regulate voltage generated by the solar panel 102. A battery 502 stores energy generated by the solar panel 102. In various embodiments, the battery 502 is a 12V DC deep cycle and/or deep cell battery; that is, the battery may be configured for being repeatedly discharged to a small fraction of its capacity and charged back to near its full capacity. Such batteries are generally available for automotive and marine applications, specifically for contexts where electricity is desired without running an engine, such as in RVs and houseboats. Such batteries contrast with stock automotive and marine batteries which are configured for light discharging only, as when running a starter motor. The solar charge controller 500 may be configured to measure battery charge via a voltage differential of one terminal of the battery 502 relative to ground or of both terminals relative to each other. The solar charge controller 500 may be configured to adjust output voltage (at the expense of current, according to Ohm's law, $V=I \cdot R$) to provide a consistent charge to the battery 502 (for example a battery or battery bank configured to output +12V DC may require a impressed voltage of +14V or more to reach maximum capacity). Additionally, the solar charge controller 500 may be configured to apply pulse width modulation (PWM) to the battery 502, rather than continuous current directly from the solar panel 102. In PWM, the solar charge controller 500 is configured to charge the battery 502 in a series of pulses, the time-length of which is adjusted based on the measured output voltage of the battery, with long near continuous pulses (or outright continuity) in the case where the battery 502 is near discharged, but short, infrequent pulses in cases where the battery 502 is near fully charged. An inverter 504, such as an off-the-shelf 12V DC to 120V or 240V AC inverter marketed for automotive or marine use, is configured to discharge the battery 500 to supply one or more sockets 504A, which may be Edison sockets for use with electrical devices sold in North America or other sockets appropriate for operating devices from other locales.

Figure 4:
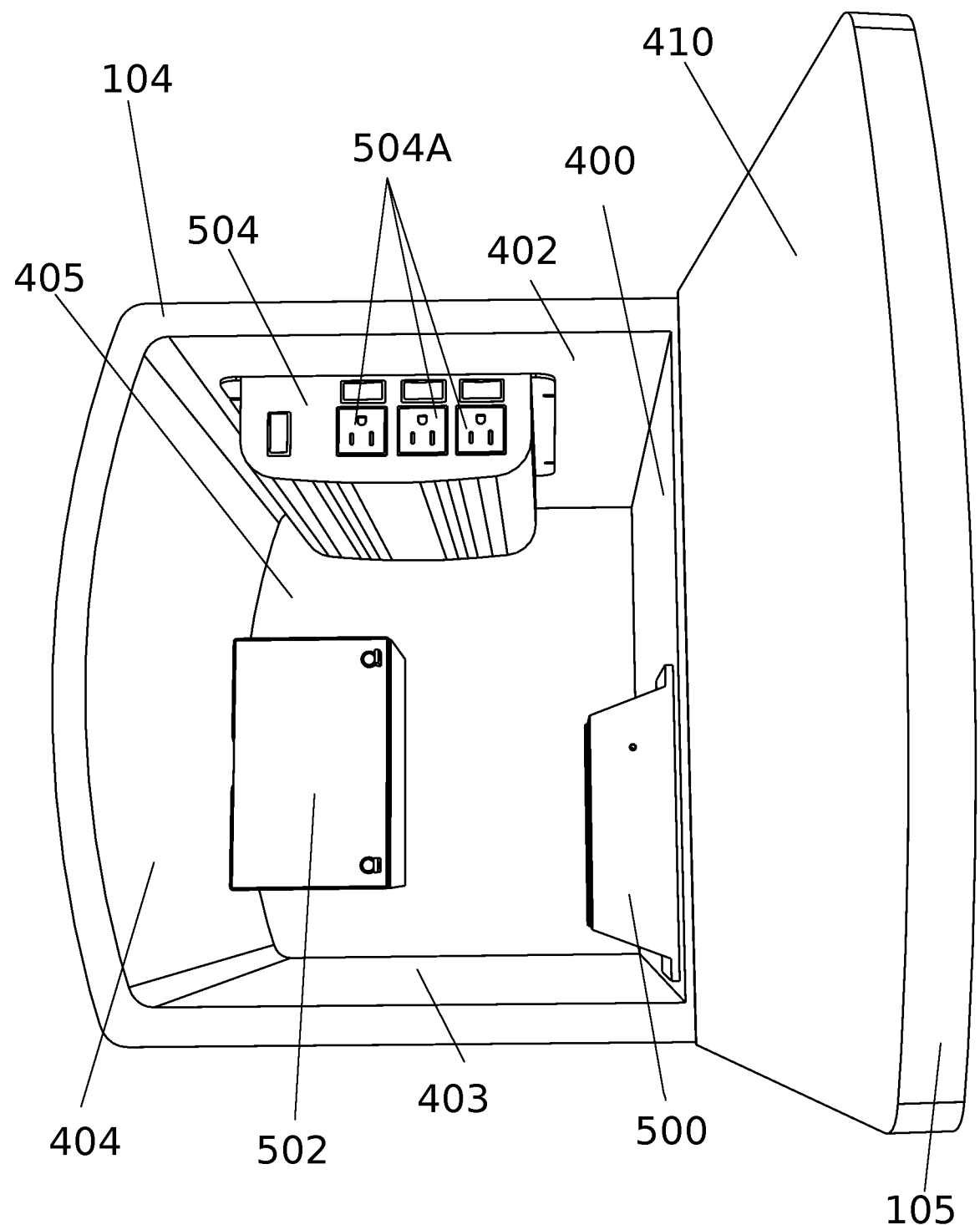
FIG. 4 is a top view of a weatherproof equipment container for a solar power system in an open configuration, in accordance with at least one embodiment of the invention.

Referring now to FIG. 4, FIG. 4 is a top view of a weatherproof equipment container for a solar power system in an open configuration, in accordance with at least one embodiment of the invention. The equipment container 104 may be understood to include an inside rear surface 400, an inside left surface 402, an inside right surface 403, an inside front surface 404, and an inside bottom surface 405. The equipment container lid 105 includes an equipment container lid inside surface 410. The various electrical components may be placed inside of the equipment container 104 in any desired configuration. In the depicted embodiment, the solar charge controller 500 is affixed to the equipment container inside rear surface 404, the inverter 504 is affixed to the equipment container inside left surface 402, and the battery 502 is affixed to the equipment container inside bottom surface 405. The various components may be affixed using screws, bolts, adhesives, or other appropriate fasteners, or they may be placed inside of the equipment container 104 unmounted.

Figure 5:
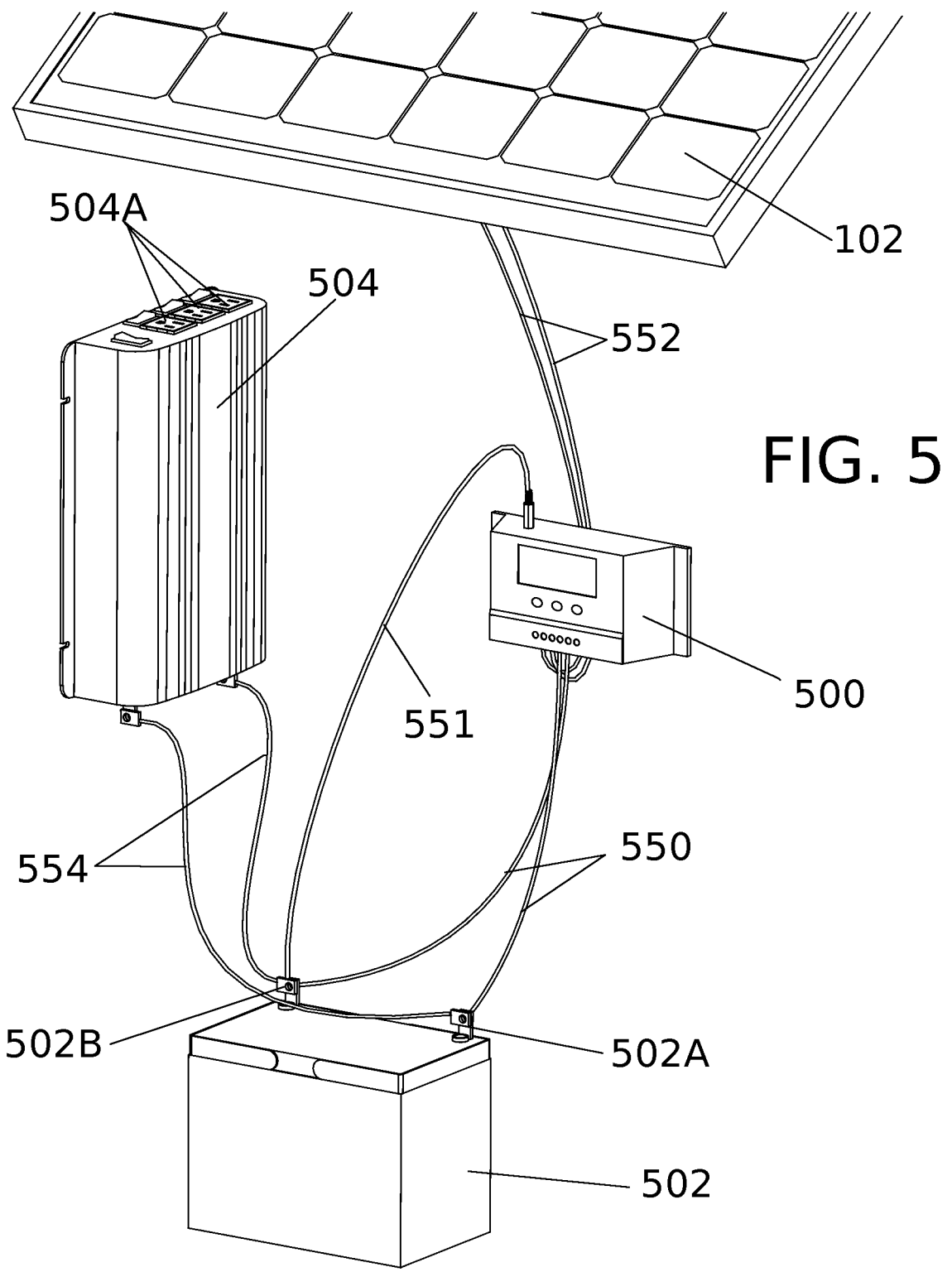
FIG. 5 is a perspective view of the isolated electrical components of a solar power system, in accordance with at least one embodiment of the invention.
Figure 6:
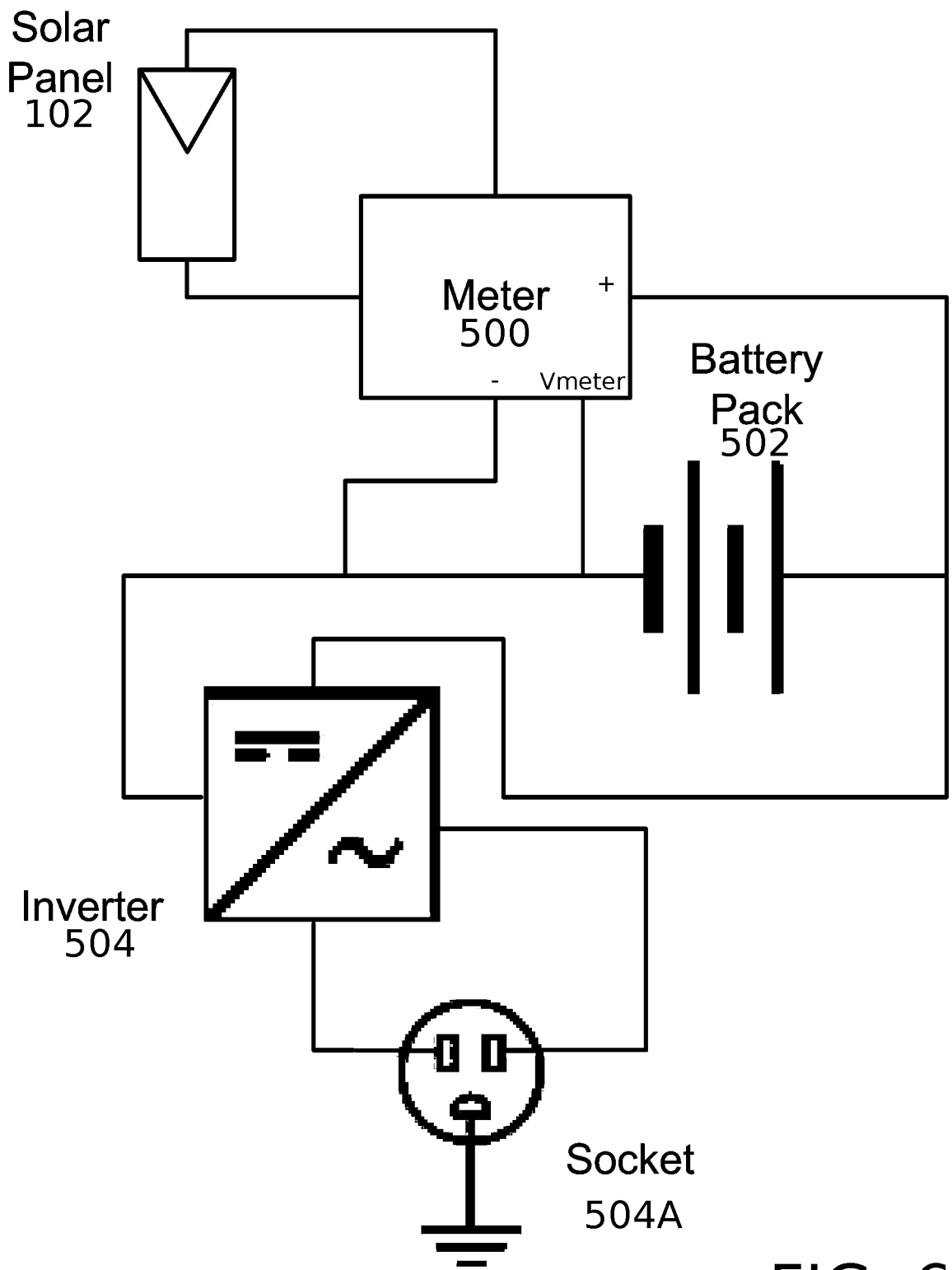
FIG. 6 is a schematic circuit diagram for a solar power system, in accordance with at least one embodiment of the invention.

Referring now to FIG. 5, FIG. 5 is a perspective view of the isolated electrical components of a solar power system, in accordance with at least one embodiment of the invention. In the depicted embodiment, first leads 552, corresponding to the solar panel leads 103, connect the solar panel 102 to the solar charge controller 500 in a configuration that enables the solar charge controller to measure energy and/or power output from the solar panel 102 over time. Second leads 552 connect the solar charge controller to each terminal 502A and 502B of the battery 502. A third lead 551 connects one terminal 502B to a measurement port on the solar charge controller 500, enabling the solar charge controller to measure the charge on the battery 502. Fourth leads 554 connect the terminals 502 and 502B of the battery 502 to the inverter 504 in a discharge configuration, enabling the sockets 504A to be supplied with 120V or 240V AC mains electricity. FIG. 6 is a schematic circuit diagram of the components and leads, according to at least one embodiment similar to that of FIG. 5.

The solar power system 100 according to various embodiments includes various contemplated methods and manners of use. In at least one embodiment, the solar power system in installed in a locale where permanent dock structures are not permitted, but seasonal installations present for only the warmer months are permitted. Thus, the bracket 240 is removably affixed to the dock 101 and then removed and the entire solar power system 100 is removed and installed seasonally.

Figure 8A:
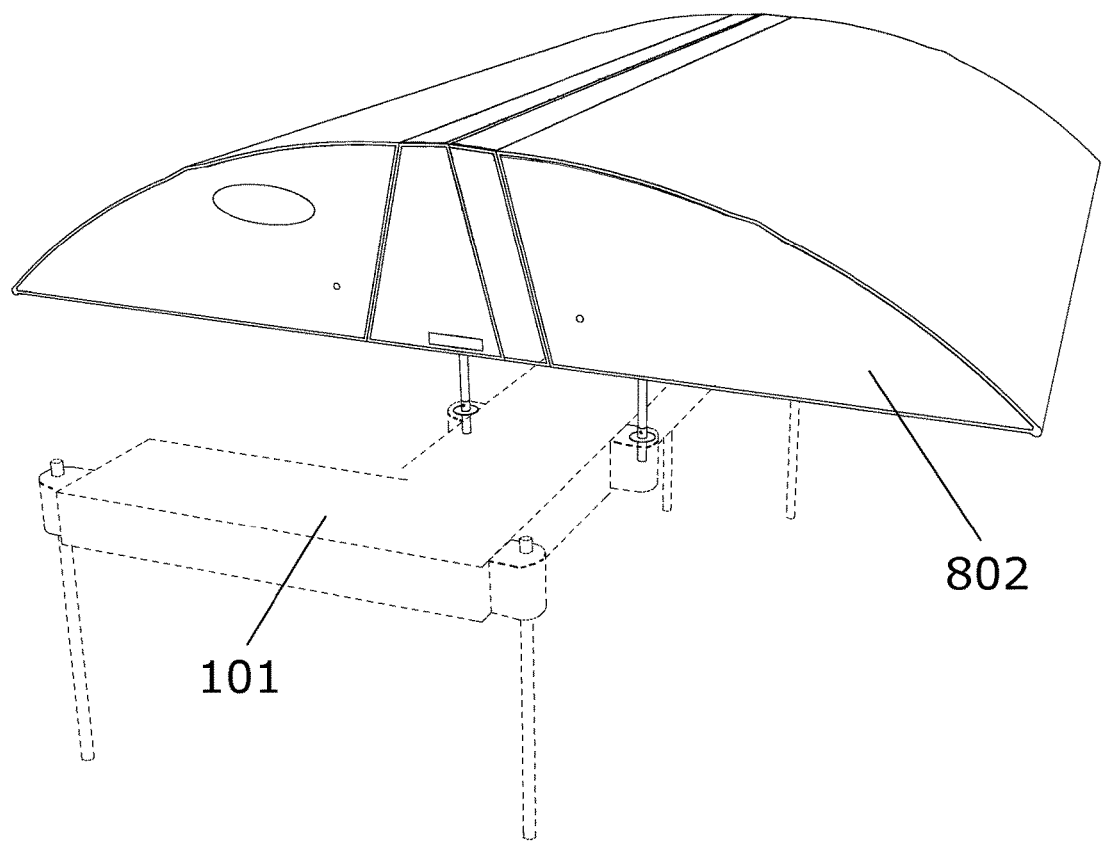
FIG. 8A is an elevated perspective view of a watercraft canopy structure, in accordance with at least one embodiment of the invention.
Figure 8B:
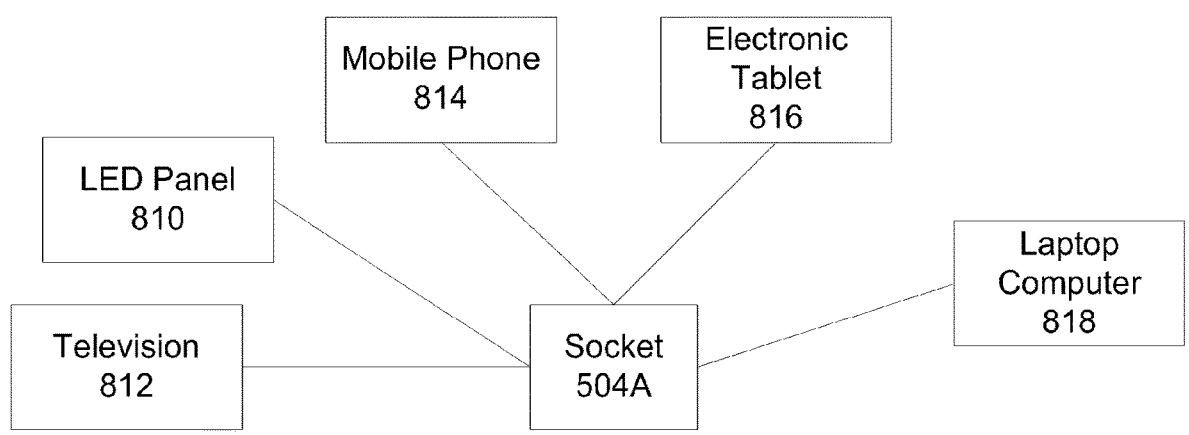
FIG. 8B is a diagram of exemplary devices receiving power via a socket, in accordance with at least one embodiment of the invention.

In another embodiment, the solar power system 100 is installed in conjunction with a watercraft canopy structure 802 (see FIG. 8A) such as is described in U.S. Pat. No. 9,556,640 to Levin and/or US Patent Application Publication No. US2016/03868571 by Levin. In such embodiments, the solar power system 100 may be installed on the dock 101 externally to the canopy or internally to the canopy, with the telescoping support 106 extending up through an opening in the canopy cover to be exposed to the sun. With the equipment container 104 near or in the canopy, the solar power system may be configured to power lights, such as LED panel lights, or a television, or be used to charge portable electronic devices such as mobile phones, electronic tablets, laptops, PDAs, etc. by plugging such devices into socket 504A (see FIG. 8B). With lighting and/or electronic entertainment available within an off-grid dock shelter, users of watercraft may continue their recreation and/or work on the watercraft in inclement weather and/or during the night.

Figure 7A:
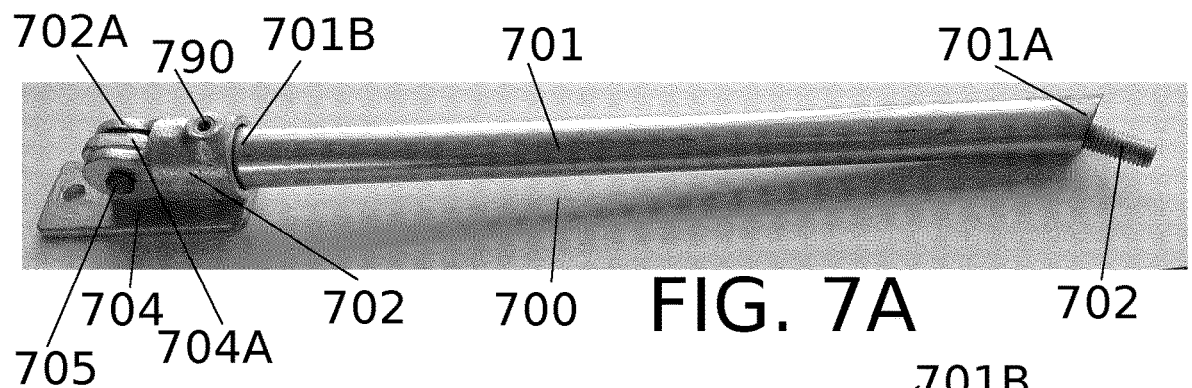
FIG. 7A is an elevated side view of a bracket back brace, in accordance with at least one embodiment of the invention.
Figure 7B:
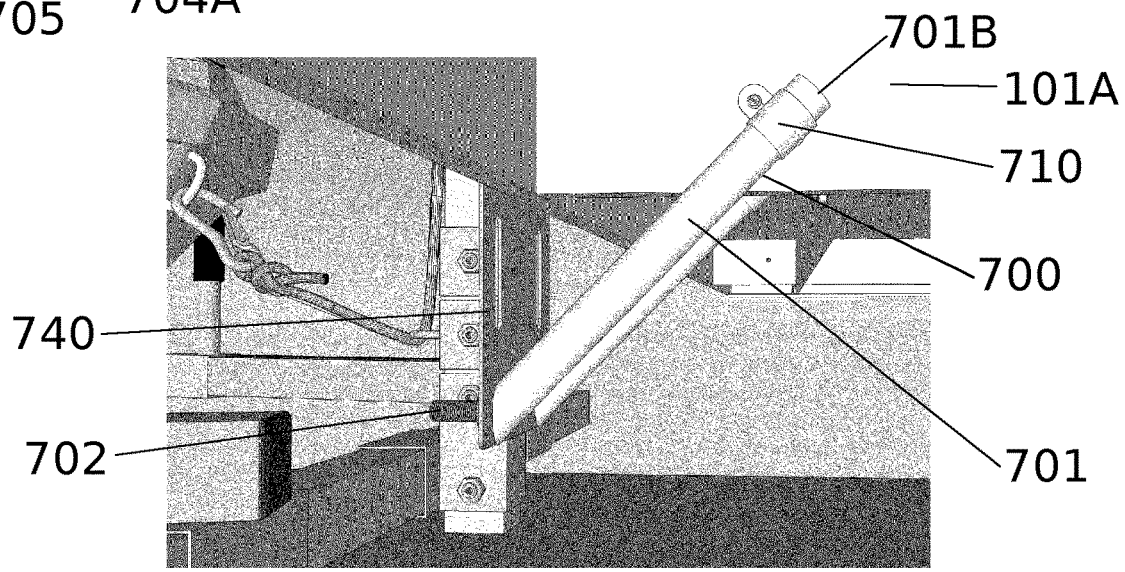
FIG. 7B is a right-rear view of a bracket back brace in an installed configuration, in accordance with at least one embodiment of the invention.
Figure 7C:
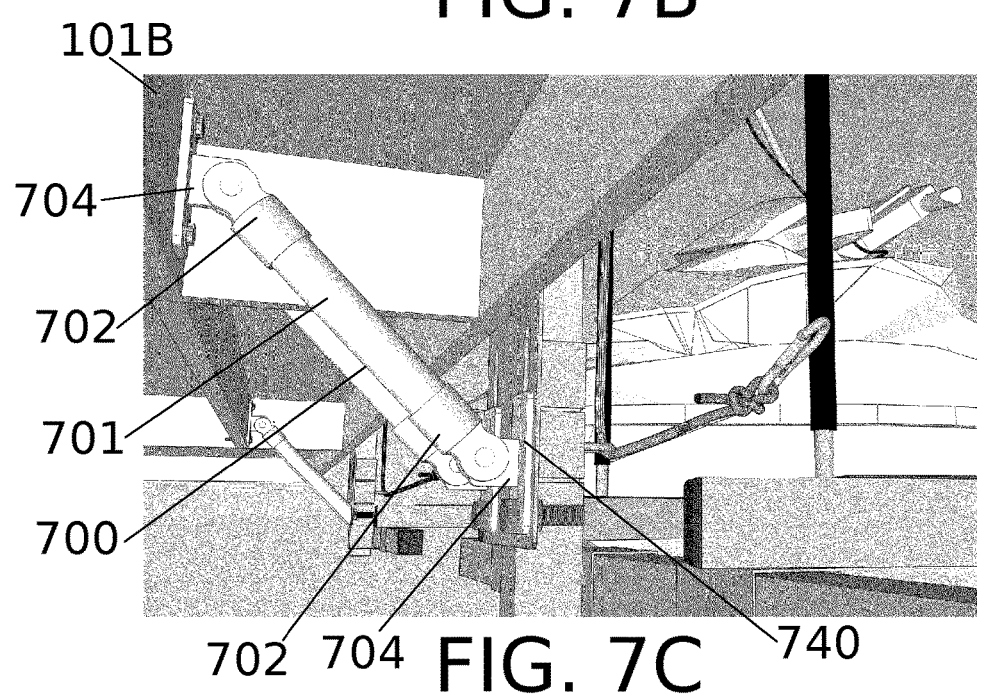
FIG. 7C is a left-rear view of a bracket back brace in an installed configuration, in accordance with at least one embodiment of the invention.

Referring now to FIGS. 7A-7C, FIG. 7A is a side-elevated view of a bracket back brace 700, in accordance with at least one embodiment of the invention. The bracket back brace 700 may support a bracket 740, analogous to the bracket 240, on a dock 100 the sides of which are too short, vertically, to accommodate the height of the bracket 740 or 240. Where a solar power system of the present invention is installed on such a dock, the bracket back brace 700 supports a bracket 240, in accordance with the above. In alternative embodiments, the bracket 740 supports other equipment, such as a watercraft docking structure, as described in U.S. patent application Ser. No. 15/444,366, and as shown in FIGS. 7B-7C. In other embodiments, the bracket back brace 700 may support a bracket 740 for dock-based watercraft canopies, such as those described in US Patent Application Publication No. US2016/0368571 and U.S. Pat. No. 9,556,640. In particular, the underside of the dock 101 may include cross-wise struts 101A (FIG. 7B) or length-wise struts (FIG. 7C), with the bracket back brace 700 adapted to suit.

The bracket back brace 700 may include a back brace member 701, which may be a rigid elongated structure made of steel, aluminum, high density plastic, or other durable material. In different configurations, the back brace member 701 may include one or both ends as a beveled end 701A, which may be cut at an angle, for example 60° or 45° relative to the axial line of the back brace member 701. The beveled end 701 may have affixed thereto or extending therefrom a threaded bolt 702. FIG. 7B shows how the beveled end 701A may be fixed to a bracket 740 and secured by a nut (e.g., a hex nut or wing nut) or other fastener. A non-beveled end 701B may also be applied to the back brace member 701. The non-beveled end 701B may be inserted into a shackle coupling 702 and secured via an embedded Allen bolt 790.

The shackle coupling 702 may include shackle arms 702A, which mate with a shackle insert 704A, which is affixed to a hinge plate 704. The shackle arms 702A and the shackle insert 704A are joined via a pin 705 to form a hinge. The hinge plate may then be affixed to a bracket 740 or lengthwise strut 701B, as shown in FIG. 7C. Where the non-beveled end 701B passes parallel to a cross-wise strut 101A, a side-mount collar 710 and fastener may be used to affix the non-beveled end 101B to the cross-wise strut 101A. Thus, in cases where the bracket 240 or 740 is of greater height than the side surface of the dock 101, the bracket back brace 700 may transfer loads on any equipment affixed to the bracket 240 or 740 to the dock 101, improving stability of the equipment.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A solar power system, comprising:
   a support comprising a top end and bottom end;
   said bottom end of said support being affixed to a substrate via a bracket;
   at least one solar panel affixed to said top end of said support;
   a weatherproof equipment container affixed to said support;
   an energy storage and discharge system housed within said weatherproof equipment container and configured to be energized by said at least one solar panel
   said at least one solar panel being set in a solar panel frame;
   a horizontal member secured to said solar panel frame by insertion through a pair of horseshoe clamps fastened to said solar panel frame at opposite edges thereof; and
   said horizontal member being disposed through a T-clamp and being retained there releasably by at least one embedded Allen bolt, said T-clamp being rotatably affixed to said top end of said support and being retained there releasably by at least one embedded Allen bolt, whereby said solar panel is rotatable about said support, pivotable about said horizontal member, and slidable through said T-clamp.

2. The solar power system of claim 1, wherein said substrate is a marine dock.

3. The solar power system of claim 1, wherein:
   said energy storage and discharge system comprises a solar charge controller, a battery, and an inverter;
   said solar charge controller is in electrical communication with said at least one solar panel;
   said solar charge controller is configured for measuring and displaying at least one of energy and power generated by said at least one solar panel;
   said solar charge controller is in electrical communication with said battery in a charging configuration;
   said battery being in electrical communication with said inverter in a discharge configuration.

4. The solar power system of claim 1, wherein:
a bracket back brace is affixed to said bracket; and
said bracket back brace is affixed to at least one strut selected from the group consisting of: a cross-wise strut and a length-wise strut of said marine dock.

5. The solar power system of claim 4, wherein said bracket back brace comprises a back brace member having a beveled end with a threaded bolt attached thereto, said threaded bolt being secured through said bracket via a nut.

6. The solar power system of claim 4, wherein said bracket back brace comprises a back brace member having a non-beveled end inserted into a shackle coupling, said shackle coupling being rotatably affixed to a hinge plate, and said hinge plate being affixed to said strut.

7. The solar power system of claim 4, wherein said bracket back brace comprises a back brace member having a non-beveled end inserted into a side-mount collar, said side-mount collar being affixed to said strut.

8. The solar power system of claim 1, wherein:
an equipment container horseshoe clamp affixes said support to a spacer such that said support is disposed through said equipment container horseshoe clamp and retained there frictionally; and
said spacer is affixed to said weatherproof equipment container such that said support is offset from said weatherproof equipment container to a distance effective to accommodate a structural device of said weatherproof equipment container.

9. A solar power system for a marine dock, comprising:
a telescoping vertical support comprising a top end and bottom end;
said bottom end of said telescoping vertical support being affixed to a marine dock via a bracket;
a solar panel affixed to said top end of said telescoping vertical support;
a weatherproof equipment container affixed to said telescoping vertical support;
a solar charge controller, a battery, and an inverter housed within said weatherproof equipment container;
said solar panel being in electrical communication with said solar charge controller;
said solar charge controller being configured for measuring and displaying at least one of energy and power generated by said solar panel;
said solar charge controller being in electrical communication with said battery in a charging configuration;
said battery being in electrical communication with said inverter in a discharge configuration;
a bracket back brace is affixed to said bracket; and
said bracket back brace is affixed to at least one strut selected from the group consisting of: a cross-wise strut and a length-wise strut of said marine dock.

10. The solar power system for a marine dock of claim 9, wherein said bracket back brace comprises a back brace member having a beveled end with a threaded bolt attached thereto, said threaded bolt being secured through said bracket via a nut.

11. The solar power system for a marine dock of claim 9, wherein said bracket back brace comprises a back brace member having a non-beveled end inserted into a shackle coupling, said shackle coupling being rotatably affixed to a hinge plate, and said hinge plate being affixed to said strut.

12. The solar power system for a marine dock of claim 9, wherein said bracket back brace comprises a back brace member having a non-beveled end inserted into a side-mount collar, said side-mount collar being affixed to said strut.

13. A solar power system for a marine dock, comprising:
a telescoping vertical support comprising a top end and bottom end;
said bottom end of said telescoping vertical support being affixed to a marine dock via a bracket;
a solar panel set in a solar panel frame;
a horizontal member secured to said solar panel frame by insertion through a pair of horseshoe clamps fastened to said solar panel frame at opposite edges thereof;
said horizontal member being disposed through a T-clamp and being retained there releasably by at least one embedded Allen bolt, said T-clamp being rotatably affixed to said top end of said telescoping vertical support and being retained there releasably by at least one embedded Allen bolt, whereby said solar panel is rotatable about said vertical support, pivotable about said horizontal member, and slidable through said T-clamp;
a weatherproof equipment container affixed to said telescoping vertical support;
a solar charge controller, a battery, and an inverter housed within said weatherproof equipment container;
said solar panel being in electrical communication with said solar charge controller;
said solar charge controller being configured for measuring and displaying at least one of energy and power generated by said solar panel;
said solar charge controller being in electrical communication with said battery in a charging configuration; and
said battery being in electrical communication with said inverter in a discharge configuration.

14. The solar power system for a marine dock of claim 13, wherein said telescoping vertical support comprises at least two telescoping sections adjustably secured under tension by a fastener.

15. The solar power system for a marine dock of claim 14, wherein said at least two telescoping sections are rotatable with respect to one another.

16. The solar power system for a marine dock of claim 13, wherein:
an equipment container horseshoe clamp affixes said telescoping vertical support to a spacer such that said telescoping vertical support is disposed through said equipment container horseshoe clamp and retained there frictionally; and
said spacer is affixed to said equipment container such that said telescoping vertical support is offset from said equipment container to a distance effective to accommodate a structural device of said equipment container.

17. The solar power system for a marine dock of claim 13, wherein said solar charge controller is configured to measure an output voltage of said battery.

18. The solar power system for a marine dock of claim 13, wherein said battery is a deep cycle battery.

19. The solar power system for a marine dock of claim 13, wherein said inverter is configured to energize at least one device selected from the group consisting of: an led panel light, a television, a mobile phone, an electronic tablet, and a laptop computer, said at least one device being located within a watercraft canopy structure.

* * * * *